US007810119B2

(12) United States Patent
Johnson

(10) Patent No.: US 7,810,119 B2
(45) Date of Patent: Oct. 5, 2010

(54) METHOD FOR SEARCHING OF AN ELECTRONIC PROGRAM GUIDE

(75) Inventor: Carolynn Rae Johnson, Indianapolis, IN (US)

(73) Assignee: Thomson Licensing, Boulogne Billancourt (FR)

( * ) Notice: Subject to any disclaimer, the term of this patent is extended or adjusted under 35 U.S.C. 154(b) by 333 days.

(21) Appl. No.: 10/468,881

(22) PCT Filed: Feb. 28, 2002

(86) PCT No.: PCT/US02/06303

§ 371 (c)(1),
(2), (4) Date: Aug. 21, 2003

(87) PCT Pub. No.: WO02/069628

PCT Pub. Date: Sep. 6, 2002

(65) Prior Publication Data

US 2004/0093616 A1    May 13, 2004

Related U.S. Application Data

(60) Provisional application No. 60/272,140, filed on Feb. 28, 2001.

(51) Int. Cl.
*H04N 4/445* (2006.01)
*G06F 3/00* (2006.01)
*G06F 7/00* (2006.01)
*G06F 13/00* (2006.01)
*G06F 17/30* (2006.01)

(52) U.S. Cl. .................. 725/53; 725/39; 725/40; 725/43; 725/44; 725/47; 725/52

(58) Field of Classification Search .................. 725/53, 725/44, 40, 43, 39, 47, 52
See application file for complete search history.

(56) References Cited

U.S. PATENT DOCUMENTS

| 5,353,121 | A | | 10/1994 | Young et al. |
| 5,410,692 | A | * | 4/1995 | Torres ........................... 707/3 |
| 5,428,735 | A | * | 6/1995 | Kahl et al. ................... 715/839 |
| 5,479,255 | A | | 12/1995 | Young et al. |
| 5,479,268 | A | | 12/1995 | Au |

(Continued)

FOREIGN PATENT DOCUMENTS

JP         02287814      11/1990

(Continued)

OTHER PUBLICATIONS

Search report dated Aug. 30, 2002.

*Primary Examiner*—Dominic D Saltarelli
(74) *Attorney, Agent, or Firm*—Robert D. Shedd; Joseph J. Opalach; Reitseng Lin

(57) ABSTRACT

A method for assisting a user in selecting a program for viewing or listening comprising periodically receiving and storing electronic program guide information comprising records for forthcoming programs, the records having a plurality of fields; receiving a user selected text string and one more user selected fields; searching the program guide information for records having the user selected text string in one or more of the user selected fields; and displaying a list of the forthcoming programs corresponding to the matching records. This invention allows for more efficient and reliable searches of an electronic program guide for user desired programming.

13 Claims, 9 Drawing Sheets

U.S. PATENT DOCUMENTS

| | | | |
|---|---|---|---|
| 5,515,106 A | | 5/1996 | Chaney et al. |
| 5,790,115 A | * | 8/1998 | Pleyer et al. .................. 715/716 |
| 5,798,785 A | | 8/1998 | Hendricks et al. .............. 348/1 |
| 5,995,155 A | | 11/1999 | Schindler et al. ............ 348/461 |
| 6,005,565 A | * | 12/1999 | Legall et al. ................. 345/721 |
| 6,008,802 A | | 12/1999 | Iki et al. ..................... 345/327 |
| 6,081,263 A | * | 6/2000 | LeGall et al. ................ 715/760 |
| 6,133,909 A | * | 10/2000 | Schein et al. ................ 345/721 |
| 6,169,543 B1 | * | 1/2001 | Wehmeyer ................... 725/47 |
| 6,216,264 B1 | * | 4/2001 | Maze et al. ................... 725/53 |
| 6,247,010 B1 | * | 6/2001 | Doi et al. ........................ 707/3 |
| 6,463,586 B1 | * | 10/2002 | Jerding ......................... 725/37 |
| 6,473,751 B1 | * | 10/2002 | Nikolovska et al. ............. 707/3 |
| 6,516,329 B1 | * | 2/2003 | Smith ...................... 715/501.1 |
| 6,614,457 B1 | * | 9/2003 | Sanada et al. ............... 715/840 |
| 6,925,650 B1 | * | 8/2005 | Arsenault et al. ............. 725/39 |
| 6,968,364 B1 | * | 11/2005 | Wong et al. ................. 709/217 |
| 7,213,256 B1 | * | 5/2007 | Kikinis ........................ 725/53 |
| 2002/0059584 A1 | * | 5/2002 | Ferman et al. ................ 725/34 |
| 2003/0014753 A1 | * | 1/2003 | Beach et al. ................... 725/53 |
| 2003/0028889 A1 | * | 2/2003 | McCoskey et al. ............ 725/91 |
| 2004/0221310 A1 | * | 11/2004 | Herrington et al. ............ 725/46 |
| 2005/0278741 A1 | * | 12/2005 | Robarts et al. ................. 725/46 |

FOREIGN PATENT DOCUMENTS

| | | |
|---|---|---|
| JP | 06131096 | 5/1994 |
| JP | 09160910 | 6/1997 |
| JP | H09-198066 | 7/1997 |
| JP | 10207906 | 8/1998 |
| JP | 10240418 | 9/1998 |
| JP | H10-326280 | 12/1998 |
| JP | 2001014103 | 1/2001 |
| WO | WO9826584 | 6/1998 |
| WO | WO9856173 A1 * | 12/1998 |
| WO | 00/08849 | 2/2000 |
| WO | 00/40028 | 7/2000 |
| WO | WO 200178383 A2 * | 10/2001 |

* cited by examiner

METHOD FOR SEARCHING OF AN ELECTRONIC PROGRAM GUIDE

This application claims the benefit, under 35 U.S.C. §365 of International Application PCT/US02/06303, filed Feb. 28, 2002, which was published in accordance with PCT Article 21(2) on Sept. 6, 2002 in English and which claims the benefit of U.S. patent application No. 60/272,140, filed Feb. 28, 2001.

FIELD OF THE INVENTION

This invention relates to the field of program guide data for television systems in general and, in particular, to searching electronic program guide data.

BACKGROUND OF TEE INVENTION

Due to the advent of cable television, direct satellite systems, and other television program broadcast systems, television viewers have very large numbers of programs from which to select. Sophisticated systems have been developed to assist a viewer in selecting programs to view or record, among which are Electronic Program Guide, (EPG).

An EPG is an interactive, on screen equivalent to TV listings found in local newspapers or other print media. An EPG can provide up to 20 different kinds of information about each program that is within the time frame covered by the EPG. The time frame typically ranges from the next hour up to seven days in advance. The information contained in an EPG includes program identification information such as, program title, start time, end time, time remaining, topic, theme, actors, writer, production studio, awards, keywords, release date, director, and a brief description. EPG program information is usually displayed in a two dimensional table or grid format with time on one axis and channel number on the other axis.

Unlike non-interactive guides that reside on a dedicated channel and merely scroll through the current programming on other channels, EPGs allow viewers to select any channel at any time within the EPG's time range. Further, EPG features include the ability to highlight individual cells of the grid containing program information. Once highlighted, the viewer can perform functions pertaining to that highlighted program. For instance, the viewer could instantly switch to that program if it is currently being aired. Viewers could also program one touch video cassette recording (VCR) or the like if the television is properly configured and connected to a recording device. Such EPGs are known in the art and are described, for instance, in U.S. Pat. Nos. 5,353,121, 5,479,268, and 5,479,266.

U.S. Pat. No. 5,515,106, Chaney, describes a data packet structure necessary to implement an EPG system. The data packet structure is designed so that both the channel information (e.g., channel name, call letters, channel number, type, etc.) and the program identification information (e.g., content, title, rating, star, etc.) relating to a program may be transmitted from a program guide database provider to a receiving apparatus such as a television efficiently.

In a system capable of displaying an EPG, an electronic host device stores a record corresponding to each upcoming television program within the EPG's time frame. Each record contains program identification data that is unique to a particular upcoming television program. Program identification data includes at least one of program title, start time, end time, time remaining, topic, theme, actors, writer, production studio, awards, keywords, release date, director, and a brief description. Records are updated periodically by both deleting records of programs that have previously aired and adding new records of upcoming programs that fall within the EPG's time frame as time passes. The EPG is then displayed on a display module, such as a television, that is associated with the electronic host device.

EPG systems often store a large number of records for upcoming programs, facilitating an EPG to display a television programming schedule that covers a significant period of time. As such, an EPG can be used to find upcoming programs that may be of interest to a user days in advance of the program being aired. Thus, a need exists for a user to be able to efficiently and reliably search an EPG for upcoming programs that match a user's interests.

Methods and apparatus exist that allow a user to search an EPG system for records containing data that matches a user's search criteria, such as a text string. Some of the prior EPG systems may allow a user to perform, for example, a "one time" "search" or an "ongoing" search of the EPG records. In performing a one time search, a user composes a text string and a single search is conducted of the records for data matching the text string. Records containing data anywhere in the record that matches the text string are delineated as a match for that search. Once all the records are searched, upcoming programs whose records were delineated as a "match" are listed for the user in the display module's display area. As described above, the user can then perform a variety of functions pertaining to the listed programs by highlighting and selecting an upcoming program cell. An ongoing search is similar to a one time search except that the user-composed text string is saved in a nonvolatile memory of the electronic host device and repetitive searches are periodically performed of the records based on the saved text string. The repetitive searches can be performed either automatically or upon user command. One existing ongoing search is known as a Scout search.

One problem with prior art searches is that prior art search apparatus and methods search an entire record for data corresponding to the user-composed text string. As a result, records that contain data corresponding to the user composed text string anywhere in the record will be returned as a match. This results in a great number of "false alarms," i.e., program records for upcoming programs that are of no interest to the user being returned as a match. For example, a search for the movie "Virus" would return as a match any and all programs whose titles, descriptions, themes, etc., contain the word virus. A search for the movie "Heavy Metal" would more often return music shows containing the term "heavy metal" in the description rather than the desired movie.

This problem is further aggravated by the additional information that is available in EPG records, including credit fields (actors, director, writer, studio, etc), awards information, and other miscellaneous information pertaining to a particular title, and by the ability to hold many days worth of guide information in the system. Continued implementation of prior art search mechanisms, therefore, will most likely return a much higher number of false alarms than hits, thus making the search feature less valuable to the user. Thus, there is a current need for an apparatus and method that searches EPG records more efficiently and reliably, resulting in less "false alarms."

SUMMARY OF THE INVENTION

These problems and others are solved by the present invention which in one aspect is a method for assisting a user in selecting a program for viewing or listening comprising periodically receiving and storing electronic program guide information comprising records for forthcoming programs, the records having a plurality of fields; receiving a user selected text string and one or more user selected fields; searching the program guide information for records having the user selected text string in one or more of the user selected fields; and displaying a list of the forthcoming programs corresponding to the matching records. Each record preferably has a field for at least one of topic, theme, description, title, actors, roles, director, writer, production studio, awards, keywords, or release date.

Preferably, the method further comprises saving the user selected text string and one or more user selected fields and repetitively searching the program guide information for records having the user selected text string in one or more of the user selected fields.

Also preferably, the method further comprises providing a user interface for performing the search, wherein the user interface has a list of the records' fields and the user designates one or more of the fields as the user selected fields by marking the data field in the list.

In another aspect, the invention is an apparatus for assisting a user in selecting a program for viewing or listening comprising means for periodically receiving and storing electronic program guide information comprising records for forthcoming programs, the records having a plurality of fields; a user interface comprising a display; user control means for entering a user selected text string and one more user selected fields; means for searching the program guide information for records having the user selected text string in one or more of the user selected fields; and means for displaying a list of the forthcoming programs corresponding to the matching records.

Preferably, the apparatus' user interface has a list of the records' fields and the user designates one or more of the fields as the user selected fields by marking the data field in the list. Also preferably, each program record of the apparatus has a field for at least one of topic, theme, description, title, actors, roles, director, writer, production studio, awards, keywords, or release date.

DETAIL OF THE INVENTION

Figure 1:
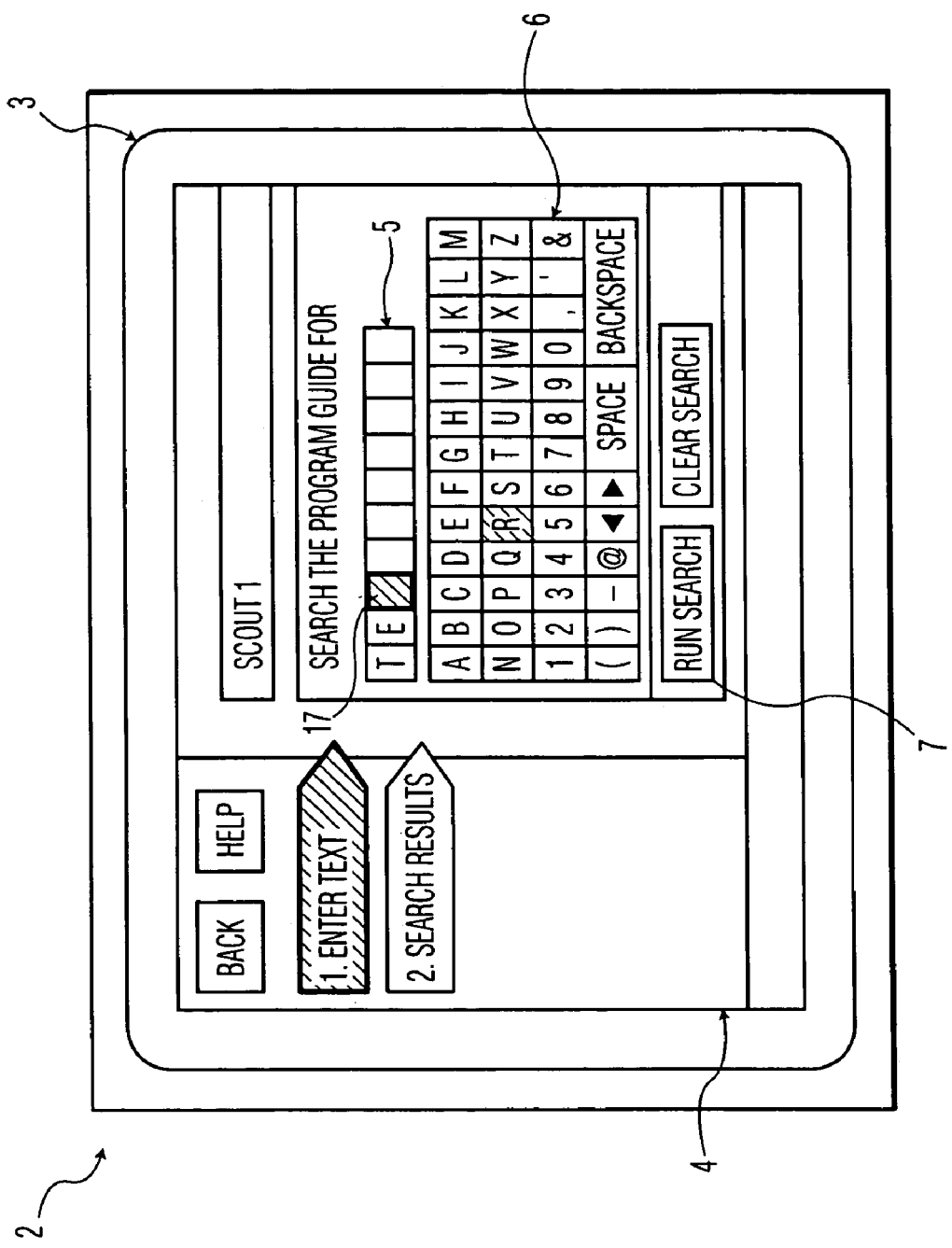
FIG. 1. is a display module having a diagrammatic representation of a prior art user search interface.
Figure 2:
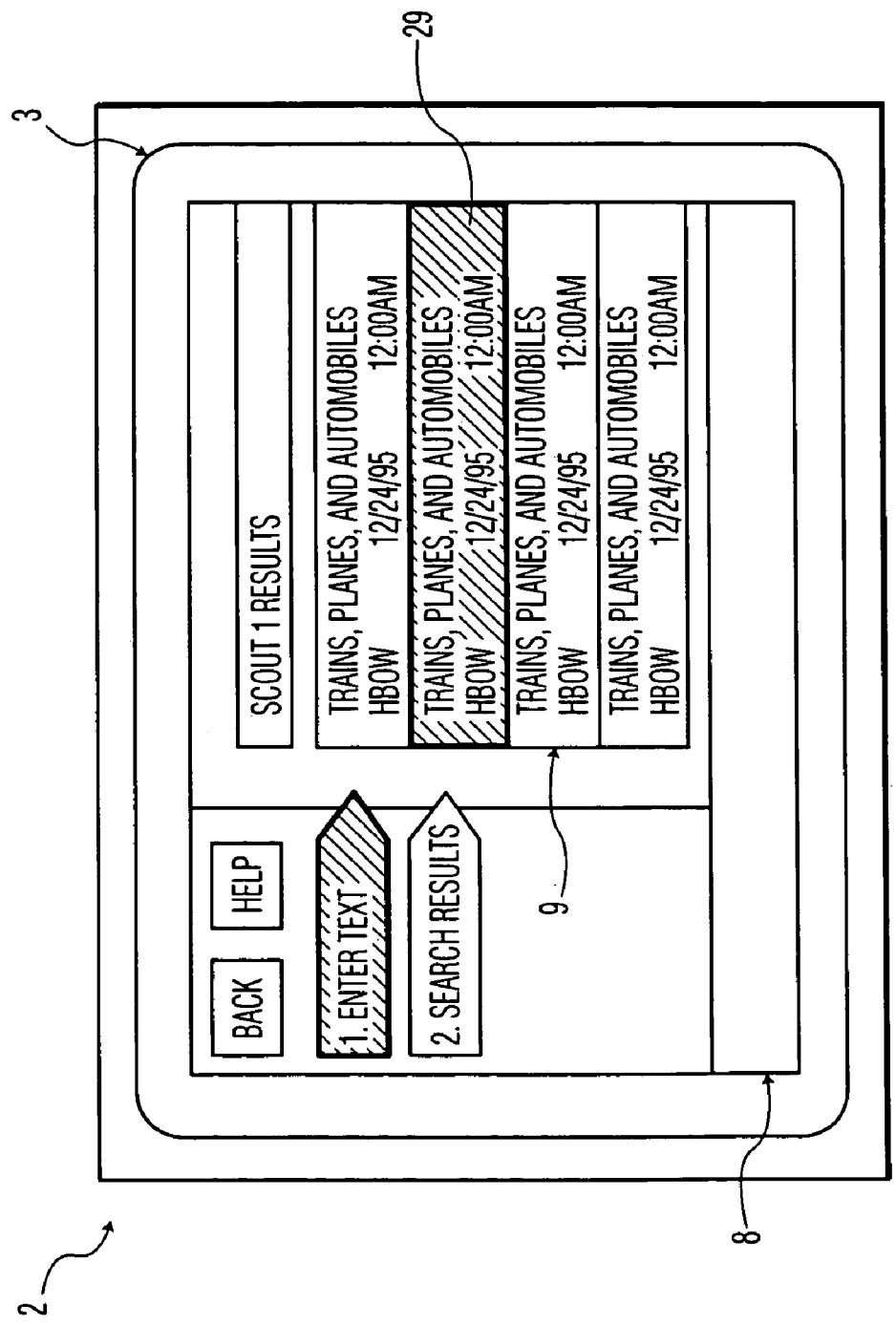
FIG. 2 is the display module having a diagrammatic representation of a prior art search result interface.

FIGS. 1 and 2 illustrate display module 2 associated with a prior art EPG electronic host device (not shown). A microprocessor (not shown) is adapted to execute software, control hardware, and output graphical data to be displayed on display module 2 in accordance with commands entered by a user through an input command module (not shown). As such, the microprocessor controls the graphical generation of and user interaction with the user interface displays shown in FIGS. 1 and 2.

Referring to FIG. 1, display module 2 comprises display area 3 having prior art user search interface 4 displayed thereon. Search interface 4 has search field 5 for receiving a user composed text string. A user composes the text string in search field 5 by selecting characters from character field 6. The user selects characters from character field 6 by moving a cursor so that it highlights a character from character field 6. The user then selects that character. This is done by using direction and selection keys located on the input command module. In the illustration, the letter "R" is highlighted in character field 6. Thus, upon receiving a selection command from the user via the input command module, the letter "R" will appear in highlighted text string box 17 of search field 5. Once the user has completed composing the text string in search field 5, the user initiates a search of the EPG records based upon the user composed text string by highlighting and selecting run search button 7 via the input command module. The prior art search apparatus searches the program guide records stored in a local memory for records that contain data that matches the user composed text string entered in search field 5. If a record is found that contains data anywhere in the record that corresponds to the user composed text string entered in search field 5, that record is delineated as a "match."

Referring to FIG. 2, once the prior art search apparatus completes its search of all the stored records, the results of the search are displayed in search result interface 8. Search result interface 8 comprises search results field 9. Search results field 9 is a list of the upcoming programs that correspond to the records that were delineated as "matches." A user can then perform certain functions with regard to the listed upcoming programs by highlighting and selecting a particular upcoming program cell. For example, the upcoming program relating to highlighted cell 29 can be viewed, recorded, etc. The apparatus searches an entire record for data corresponding to the user composed text string. Thus, if there is data located anywhere in the record that matches the user composed text string, that program record will be delineated as a match. As such, many false alarms will be returned as "matches" in search results field 9.

Figure 3:
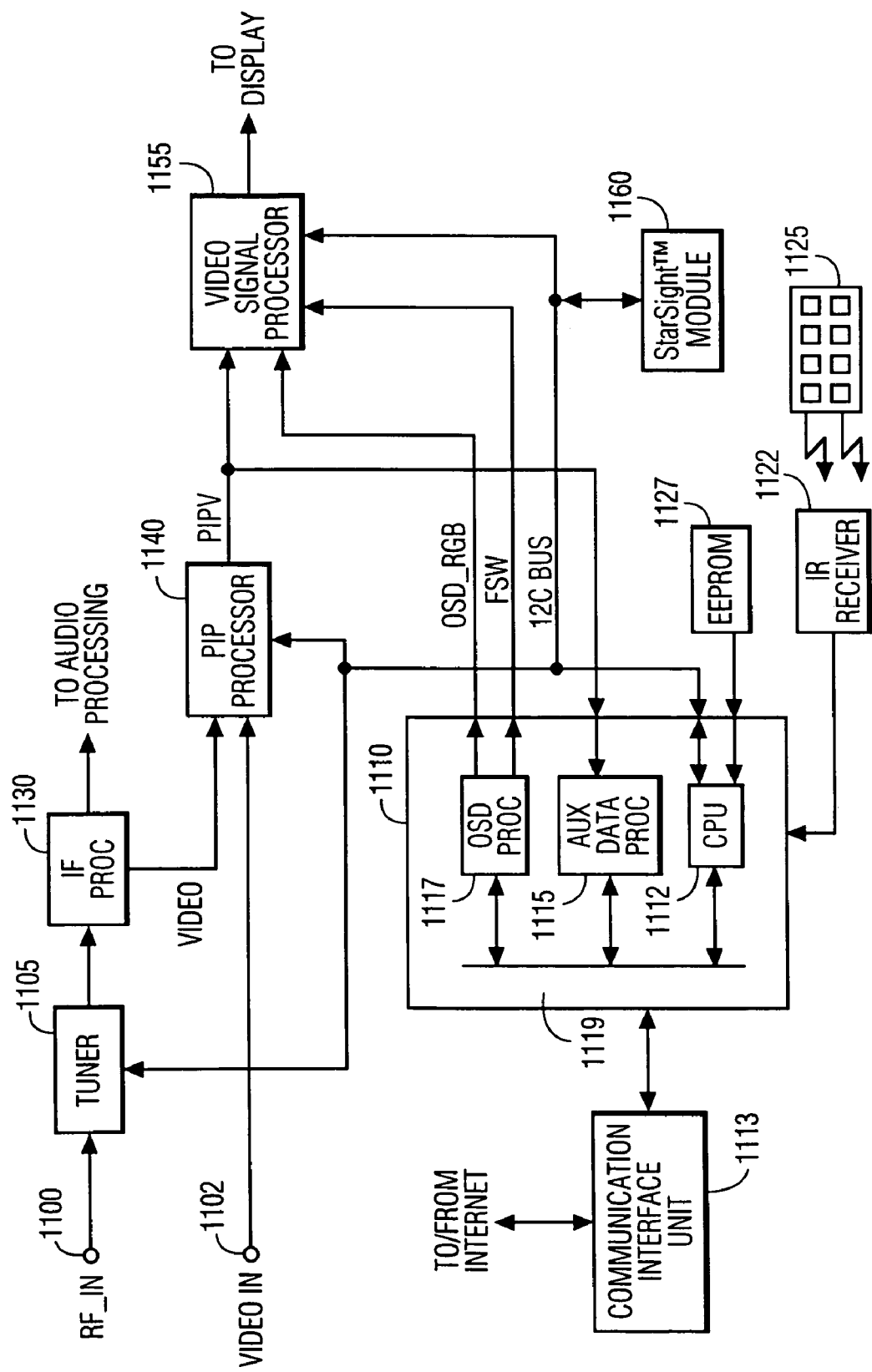
FIG. 3 is a schematic of an apparatus capable of processing user commands and displaying user interface screens in accordance with the present invention.
Figure 6:
FIG. 6 is a display module having a diagrammatic representation of an electronic program guide (EPG) display.
Figure 7:
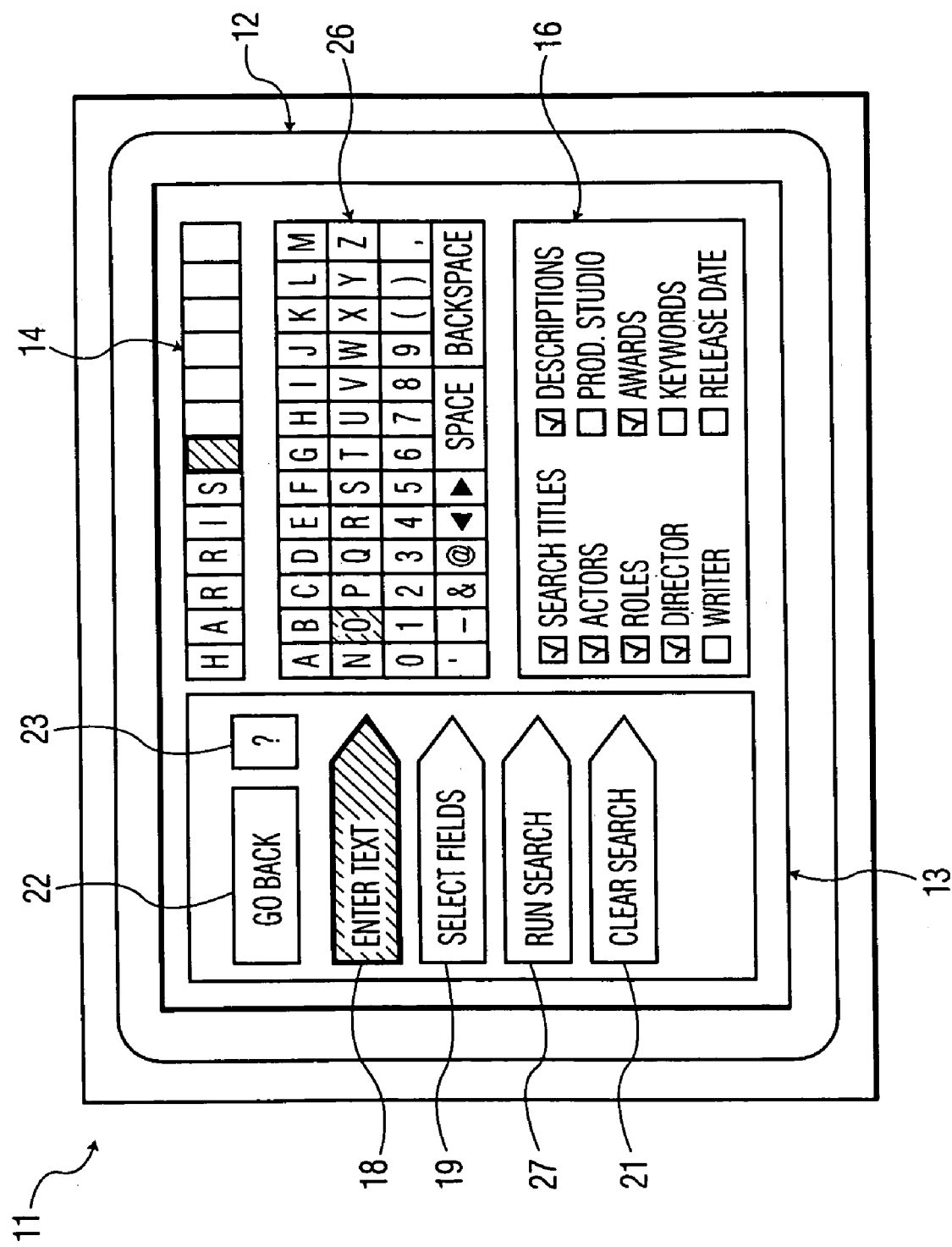
FIG. 7 is a display module having a diagrammatic representation of a user search interface in accordance with the present invention;.
Figure 8:
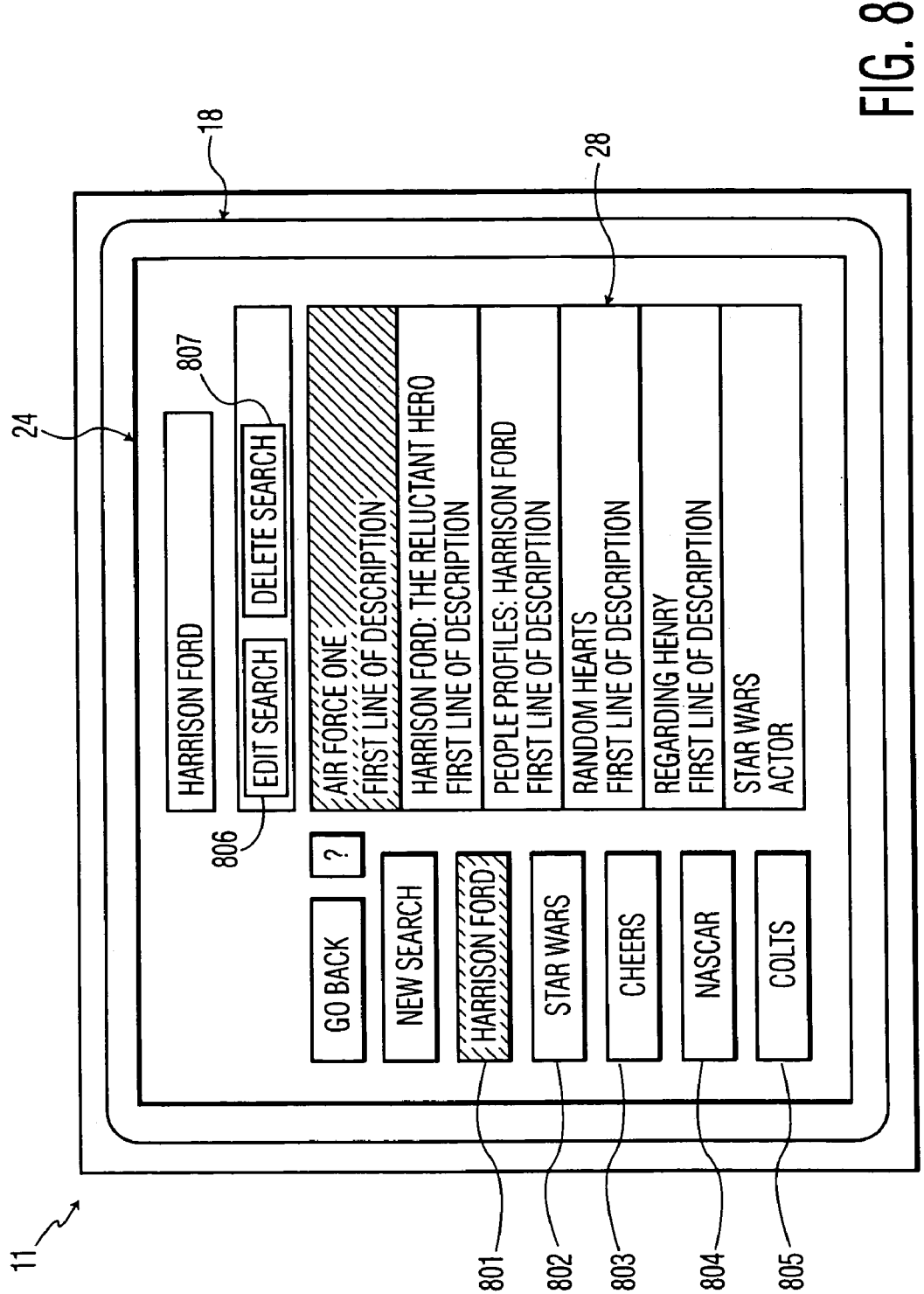
FIG. 8 is a display module having a diagrammatic representation of a user search results interface according to the present invention.

FIG. 3 is a schematic of an apparatus capable of processing user commands, displaying the user interface screens of FIGS. 6, 7, and 8, and performing searches of stored program guide records in accordance with the present invention. The apparatus is capable of processing both analog NTSC television signals and internet information. The apparatus of FIG. 3 has a first input 1100 for receiving television signal RF_IN at RF frequencies and a second input 1102 for receiving baseband television signal VIDEO IN. Signal RF_IN may be supplied from a source such as an antenna or cable system while signal VIDEO IN may be supplied, for example, by a video cassette recorder (VCR). Tuner 1105 and IF processor 1130 operate in a conventional manner for tuning and demodulating a particular television signal that is included in signal RF_IN. IF processor 1130 produces baseband video signal VIDEO representing the video program portion of the tuned television signal. IF processor 1130 also produces a baseband audio signal that is coupled to an audio processing section (not shown in FIG. 3) for further audio processing. Although FIG. 3 shows input 1102 as a baseband signal, the television receiver could include a second tuner and IF processor similar to units 1105 and 1130 for producing a second baseband video signal from either signal RF_IN or from a second RF signal source.

The system shown in FIG. 3 also includes a main microprocessor (mP) 1110 for controlling components of the television receiver such as tuner 1105, picture-in-picture processing unit 1140, video signal processor 1155, and StarSight™. data processing module 1160. As used herein, the term "microprocessor" represents various devices including, but not limited to, microprocessors, microcomputers, microcontrollers and controllers. Microprocessor 1110 controls the system by sending and receiving both commands and data via serial data bus I²C BUS which utilizes the well-known I²C serial data bus protocol. More specifically, central processing unit (CPU) 1112 within mp 1110 executes control programs contained within memory, such as EEPROM 1127 shown in FIG. 3, in response to commands provided by a user, e.g., via IR remote control 1125 and IR receiver 1122. For example, activation of a "CHANNEL UP" feature on remote control 1125 causes CPU 1112 to send a "change channel" command along with channel data to tuner 1105 via I²C BUS. As a result, tuner 1105 tunes the next channel in the channel scan list. Another example of a control program stored in EEPROM 1127 is software for implementing the operations shown in FIGS. 6,7,8, and 9 (in flow chart form) in accordance with the present invention as to be described below.

Main microprocessor 1110 also controls the operation of a communications interface unit 1113 for providing the capability to upload and download information to and from the internet. Communication interface unit 1113 includes, for example, a modem for connecting to an internet service provider, e.g., via a telephone line or via a cable television line. The communication capability allows the system shown in FIG. 3 to provide email capability and internet related features such as web browsing in addition to receiving television programming.

CPU 1112 controls functions included within mP 1110 via bus 1119 within mP 1110. In particular, CPU 1112 controls auxiliary data processor 1115 and on-screen display (OSD) processor 1117. Auxiliary data processor 1115 extracts auxiliary data such as StarSight™ data from video signal PIPV.

StarSight™ data which provides program guide data information in a known format is typically received only on a particular television channel and the television receiver must tune that channel to extract StarSight™ data. To prevent StarSight™ data extraction from interfering with normal use of the television receiver, CPU 1112 initiates StarSight™ data extraction by tuning the particular channel only during a time period when the television receiver is usually not in use (e.g., 2:00 AM). At that time, CPU 1112 configures decoder 1115 such that auxiliary data is extracted from horizontal line intervals such as line 16 that are used for StarSight™ data. CPU 1112 controls the transfer of extracted StarSight™ data from decoder 1115 via I²C BUS to StarSight™ module 1160. A processor internal to the module formats and stores the data in memory within the module. In response to the StarSight™ EPG display being activated (e.g., a user activating a particular key on remote control 125), CPU 1112 transfers formatted StarSight™ EPG display data from StarSight™ module 1160 via I²C BUS to OSD processor 1117.

OSD processor 1117 operates in a conventional manner to produce R, G, and B video signals OSD_RGB that, when coupled to a displayed device (not shown), will produce a displayed image representing on-screen display information in according to FIGS. 6-9 to be described later. OSD processor 1117 also produces control signal Fast-Switch (FSW) which is intended to control a fast switch for inserting signals OSD_RGB into the system's video output signal at times when an on-screen display is to be displayed. Therefore, when a user enables the various user interface screens of the present invention to be described later, OSD processor 1117 produces the corresponding signals OSD_RGB representing the on-screen display information previously stored or programmed in the memory 1127. For example, when a user enables an EPG, e.g., by activating a particular switch on remote control 1125, CPU 1112 enables processor 1117. In response, processor 1117 produces signals OSD_RGB representing the program guide data information previously extracted and already stored in memory, as discussed above. Processor 1117 also produces signal FSW indicating when the EPG is to be displayed.

Video signal processor (VSP) 1155 performs conventional video signal processing functions, such as luma and chroma processing. Output signals produced by VSP 1155 are suitable for coupling to a display device, e.g., a kinescope or LCD device (not shown in FIG. 3), for producing a displayed image. VSP 1155 also includes a fast switch for coupling signals produced by OSD processor 1117 to the output video signal path at times when graphics and/or text is to be included in the displayed image. The fast switch is controlled by control signal FSW which is generated by OSD processor 1117 in main microprocessor 1110 at times when text and/or graphics are to be displayed.

The input signal for VSP 1155 is signal PIPV that is output by picture-in-picture (PIP) processor 1140. When a user activates PIP mode, signal PIPV represents a large picture (large pix) into which a small picture (small pix) is inset. When PIP mode is inactive, signal PIPV represents just the large pix, i.e., no small pix signal is included in signal PIPV. PIP processor 1140 provides the described functionality in a conventional manner using features included in unit 1140 such as a video switch, analog-to-digital converter (ADC), RAM, and digital to analog converter (DAC).

As mentioned above, the display data included in the EPG display is produced by OSD processor 1117 and included in the output signal by VSP 1155 in response to fast switch signal FSW. When controller 1110 detects activation of the EPG display, e.g., when a user presses an appropriate key on remote control 1125, controller 1110 causes OSD processor 1117 to produce the EPG display using information such as program guide data from StarSight™ module 1160. Controller 1110 causes VSP 1155 to combine the EPG display data from OSD processor 1117 and the video image signal in response to signal FSW to produce a display including EPG. The EPG can occupy all or only a portion of the display area.

When the EPG display is active, controller 1110 executes an EPG control program stored in EEPROM 1127. The control program monitors the location of a position indicator, such as a cursor and/or highlighting, in the EPG display. A user controls the location of the position indicator using direction and selection keys of remote control 1125. Alternatively, the system could include a mouse device. Controller 1110 detects activation of a selection device, such as clicking a mouse button, and evaluates current cursor location information in conjunction with EPG data being displayed to determine the function desired, e.g., tuning a particular program Controller 1110 subsequently activates the control action associated with the selected feature.

The process and displaying of a program guide in accordance with the present invention may be implemented using a combination of software and hardware. For example, referring to FIG. 3, display of an EPG may be implemented by software in memory such as EEPROM 1127. Activation of an EPG, e.g., by a user pressing an EPG related button on remote control 1125, causes CPU 1112 to execute the EPG software routine. As part of generating an EPG display, CPU 1112 also accesses EPG data and graphics that may be stored in StarSight™ module 1160 via the 12C bus. Under control of the EPG software routine stored in EEPROM 1127, CPU 1112 enables OSD processor 1117 which formats the EPG data into a form suitable for producing an OSD representing the EPG data and graphics. The OSD data produced by OSD processor 1117 is coupled to video signal processor (VSP) 1155 via signal lines OSD_RGB. A fast switch in VSP 1155 couples in the EPG OSD data to the output of VSP 1155 under control of signal FSW. That is, the software routine being executed by CPU 1112 determines when the EPG data is to be displayed (e.g., what portion of the display) and sets signal FSW to the appropriate state for causing the fast switch to couple the EPG data to the output.

An exemplary embodiment of the features of the system shown in FIG. 3 that have been described thus far comprises an ST9296 microprocessor produced by SGS-Thomson Microelectronics for providing the features associated with mP 1110; an M65616 picture-in-picture processor produced by Mitsubishi for providing the described basic PIP functionality associated with PIP processor 1140; and an LA7612 video signal processor produced by Sanyo for providing the functions of VSP 1155.

Figure 4:
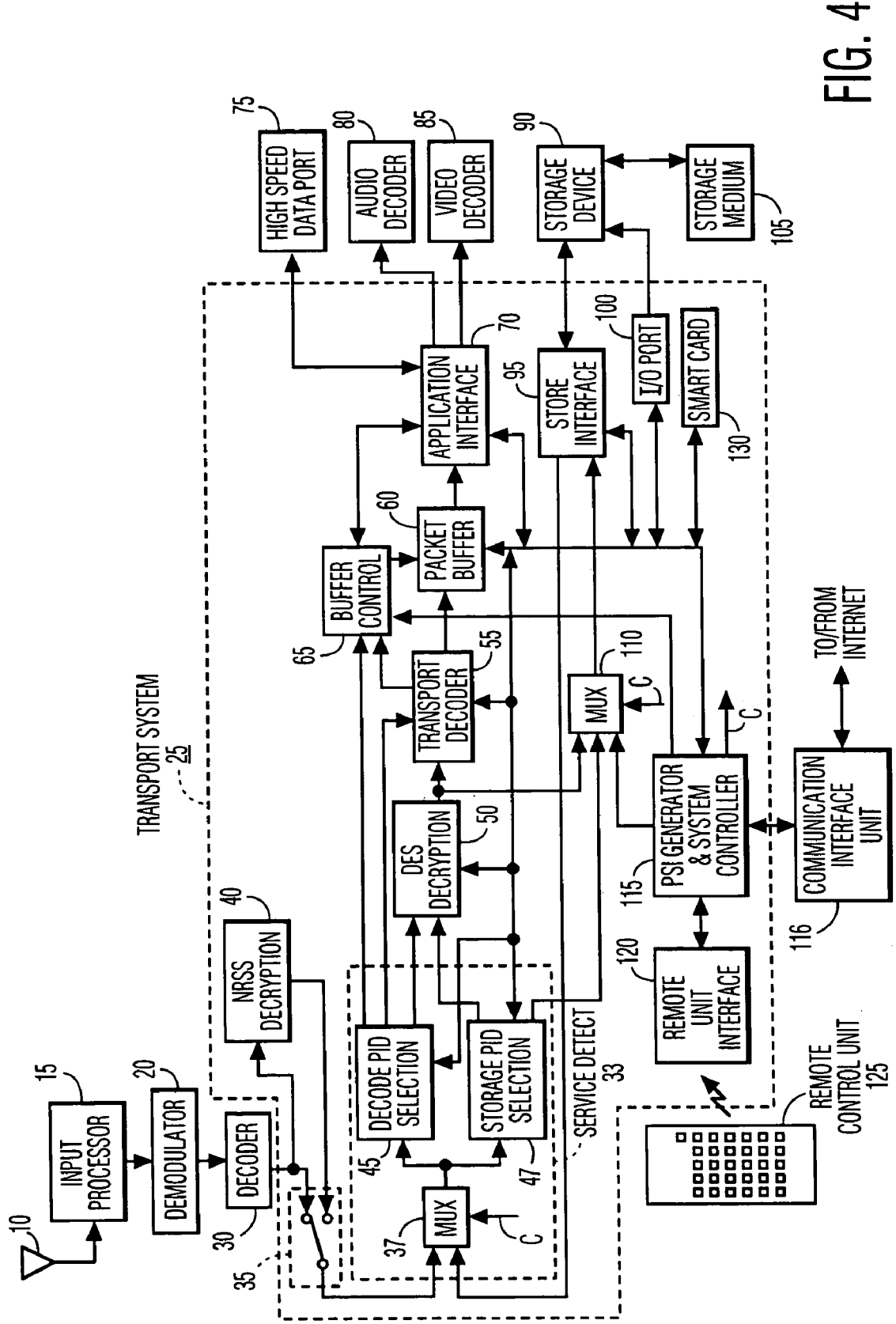
FIG. 4 is a schematic of a digital video processing apparatus suitable for processing user commands and displaying user interface screens in accordance with the present invention.

FIG. 4 shows another example of an apparatus capable of processing user commands, displaying the user interface screens of FIGS. 6, 7, and 8, and performing searches of stored program guide records in accordance with the present invention. As described below, the apparatus shown in FIG. 4 is an MPEG compatible system for receiving MPEG encoded transport streams representing broadcast programs. However, the system shown in FIG. 4 is exemplary only. The user interface system described herein is also applicable to other types of digital signal processing devices including non-MPEG compatible systems, involving other types of encoded datastreams. For example, other devices include digital video disc (DVD) systems and MPEG program streams, and systems combining computer and television functions such as the so-called "PCTV." Further, although the system described below is described as processing broadcast programs, this is exemplary only. The term "program" is used to represent any form of packetized data such as telephone messages, computer programs, internet data or other communications, for example.

In overview, in the video receiver system of FIG. 4, a carrier modulated with video data is received by antenna 10 and processed by unit 15. The resultant digital output signal is demodulated by demodulator 20 and decoded by decoder 30. The output from decoder 30 is processed by transport system 25 which is responsive to commands from remote control unit 125. System 25 provides compressed data outputs for storage, further decoding, or communication to other devices.

Video and audio decoders 85 and 80 respectively, decode the compressed data from system 25 to provide outputs for display. Data port 75 provides an interface for communication of the compressed data from system 25 to other devices such as a computer or High Definition Television (HDTV) receiver, for example. Storage device 90 stores the compressed data from system 25 on storage medium 105. Device 90, in a playback mode also supports retrieval of the compressed data from storage medium 105 for processing by system 25 for decoding, communication to other devices or storage on a different storage medium (not shown to simplify drawing).

In FIG. 4, a carrier modulated with video data received by antenna 10, is converted to digital form and processed by input processor 15. Processor 15 includes radio frequency (RF) tuner and intermediate frequency (IF) mixer and amplification stages for down-converting the input video signal to a lower frequency band suitable for further processing. The resultant digital output signal is demodulated by demodulator 20 and decoded by decoder 30. The output from decoder 30 is further processed by transport system 25.

Multiplexer (mux) 37 of service detector 33 is provided, via selector 35, with either the output from decoder 30, or the decoder 30 output further processed by a descrambling unit 40. Descrambling unit 40 may be, for example, a removable unit such as a smart card in accordance with ISO 7816 and NRSS (National Renewable Security Standards) Committee standards (the NRSS removable conditional access system is defined in EIA Draft Document IS-679, Project PN-3639). Selector 35 detects the presence of an insertable, compatible, descrambling card and provides the output of unit 40 to mux 37 only if the card is currently inserted in the video receiver unit. Otherwise selector 35 provides the output from decoder 30 to mux 37. The presence of the insertable card permits unit 40 to descramble additional premium program channels, for example, and provide additional program services to a viewer. It should be noted that in the preferred embodiment NRSS unit 40 and smart card unit 130 (smart card unit 130 is discussed later) share the same system 25 interface such that only either an NRSS card or a smart card may be inserted at any one time. However, the interfaces may also be separate to allow parallel operation.

The data provided to mux 37 from selector 35 is in the form of an MPEG compliant packetized transport datastream as defined in MPEG systems standard section 2.4 and includes program guide information and the data content of one or more program channels. The individual packets that comprise particular program channels are identified by Packet Identifiers (PIDs). The transport stream contains Program Specific Information (PSI) for use in identifying the PIDs and assembling individual data packets to recover the content of all the program channels that comprise the packetized datastream. Transport system 25, under the control of the system controller 115, acquires and collates program guide information from the input transport stream, storage device 90 or an Internet service provider via the communication interface unit 116. The individual packets that comprise either particular program channel content or Program Guide information, are identified by their Packet Identifiers (PIDs) contained within header information. As discussed above, the program description contained in the program guide information may comprise different program descriptive fields such as title, star, rating, etc., relating to a program.

The user interface incorporated in the video receiver shown in FIG. 4 enables a user to activate various features by selecting a desired feature from an on-screen display (OSD) menu. The OSD menu may include an electronic program guide (EPG) as described above, and other features discussed below.

Data representing information displayed in the OSD menu is generated by system controller 115 in response to stored on-screen display (OSD) information representing text/graphics, stored program guide information, and/or program guide and text/graphics information received via the input signal as described above and in accordance with exemplary control programs to be shown in FIGS. 6-9, and to be discussed below. The software control programs may be stored, for example, in embedded memory (not shown) of system controller 115.

Using remote control unit 125 (or other selection means such as a mouse) a user can select from the OSD menu items such as a program to be viewed, a program to be stored (e.g., recorded), the type of storage media and manner of storage. System controller 115 uses the selection information, provided via interface 120, to configure system 25 to select the programs for storage and display and to generate PSI suitable for the selected storage device and media. Controller 115 configures system 25 elements 45,47,50,55,65 and 95 by setting control register values within these elements via a data bus and by selecting signal paths via muxes 37 and 110 with control signal C.

In response to control signal C, mux 37 selects either, the transport stream from unit 35, or in a playback mode, a datastream retrieved from storage device 90 via store interface 95. In normal, non-playback operation, the data packets comprising the program that the user selected to view are identified by their PIDs by selection unit 45. If an encryption indicator in the header data of the selected program packets indicates the packets are encrypted, unit 45 provides the packets to decryption unit 50. Otherwise unit 45 provides non-encrypted packets to transport decoder 55. Similarly, the data packets comprising the programs that the user selected for storage are identified by their PIDs by selection unit 47. Unit 47 provides encrypted packets to decryption unit 50 or non-encrypted packets to mux 110 based on the packet header encryption indicator information.

The functions of decryptors 40 and 50 may be implemented in a single removable smart card which is compatible with the NRSS standard. The approach places all security related functions in a removable unit that can easily be replaced if a service provider decides to change encryption techniques or to permit easily changing the security system, e.g., to descramble a different service.

Units 45 and 47 employ PID detection filters that match the PIDs of incoming packets provided by mux 37 with PID values pre-loaded in control registers within units 45 and 47 by controller 115. The pre-loaded PIDs are used in units 47 and 45 to identify the data packets that are to be stored and the data packets that are to be decoded for use in providing a video image. The pre-loaded PIDs are stored in look-up tables in units 45 and 47. The PID look-up tables are memory mapped to encryption key tables in units 45 and 47 that associate encryption keys with each pre-loaded PID. The memory mapped PID and encryption key look-up tables permit units 45 and 47 to match encrypted packets containing a pre-loaded PID with associated encryption keys that permit their decryption. Non-encrypted packets do not have associated encryption keys. Units 45 and 47 provide both identified packets and their associated encryption keys to decryptor 50. The PID look-up table in unit 45 is also memory mapped to a destination table that matches packets containing pre-loaded PIDs with corresponding destination buffer locations in packet buffer 60. The encryption keys and destination buffer location-addresses associated with the programs selected by a user for viewing or storage are pre-loaded into units 45 and 47 along with the assigned PIDs by controller 115. The encryption keys are generated by ISO 7816-3 compliant smart card system 130 from encryption codes extracted from the input datastream. The generation of the encryption keys is subject to customer entitlement determined from coded information in the input data stream and/or pre-stored on the insertable smart card itself (International Standards Organization document ISO 7816-3 of 1989 defines the interface and signal structures for a smart card system).

The packets provided by units 45 and 47 to unit 50 are encrypted using an encryption technique such as the Data Encryption Standard (DES) defined in Federal Information Standards (FIPS) Publications 46, 74 and 81 provided by the National Technical Information Service, Department of Commerce. Unit 50 decrypts the encrypted packets using corresponding encryption keys provided by units 45 and 47 by applying decryption techniques appropriate for the selected encryption algorithm. The decrypted packets from unit 50 and the non-encrypted packets from unit 45 that comprise the program for display are provided to decoder 55. The decrypted packets from unit 50 and the non-encrypted packets from unit 47 that comprise the program for storage are provided to mux 110.

Unit 60 contains four packet buffers accessible by controller 115. One of the buffers is assigned to hold data destined for use by controller 115 and the other three buffers are assigned to hold packets that are destined for use by application devices 75, 80 and 85. Access to the packets stored in the four buffers within unit 60 by both controller 115 and by application interface 70 is controlled by buffer control unit 65. Unit 45 provides a destination flag to unit 65 for each packet identified by unit 45 for decoding. The flags indicate the individual destination locations for the identified packets and are stored by control unit 65 in an internal memory table. Control unit 65 determines a series of read and write pointers associated with packets stored in buffer 60 based on the First-In-First-Out (FIFO) principle. The write pointers in conjunction with the destination flags permit sequential storage of an identified packet from units 45 or 50 in the next empty location within the appropriate destination buffer in unit 60. The read pointers permit sequential reading of packets from the appropriate unit 60 destination buffers by controller 115 and application interface 70.

The non-encrypted and decrypted packets provided by units 45 and 50 to decoder 55 contain a transport header as defined by section 2.4.3.2 of the MPEG systems standard. Decoder 55 determines from the transport header whether the non-encrypted and decrypted packets contain an adaptation field (per the MPEG systems standard). The adaptation field contains timing information including, for example, Program Clock References (PCRs) that permit synchronization and decoding of content packets. Upon detection of a timing information packet, that is a packet containing an adaptation field, decoder 55 signals controller 115, via an interrupt mechanism by setting a system interrupt, that the packet has been received. In addition, decoder 55 changes the timing packet destination flag in unit 65 and provides the packet to unit 60. By changing the unit 65 destination flag, unit 65 diverts the tiling information packet provided by decoder 55 to the unit 60 buffer location assigned to hold data for use by controller 115, instead of an application buffer location.

Upon receiving the system interrupt set by decoder 55, controller 115 reads the tiring information and PCR value and stores it in internal memory. PCR values of successive timing information packets are used by controller 115 to adjust the system 25 master clock (27 MHz). The difference between PCR based and master clock based estimates of the time interval between the receipt of successive timing packets, generated by controller 115, is used to adjust the system 25 master clock. Controller 115 achieves this by applying the derived time estimate difference to adjust the input control voltage of a voltage controlled oscillator used to generate the master clock. Controller 115 resets the system interrupt after storing the timing information in internal memory.

Packets received by decoder 55 from units 45 and 50 that contain program content including audio, video, caption, and other information, are directed by unit 65 from decoder 55 to the designated application device buffers in packet buffer 60. Application control unit 70 sequentially retrieves the audio, video, caption and other data from the designated buffers in buffer 60 and provides the data to corresponding application devices 75, 80 and 85. The application devices comprise audio and video decoders 80 and 85 and high speed data port 75. For example, packet data corresponding to a composite program guide generated by the controller 115 as described above and as shown in FIG. 6, may be transported to the video decoder 85 for formatting into video signal suitable for display on a monitor (not shown) connected to the video decoder 85. Also, for example, data port 75 may be used to provide high speed data such as computer programs, for example, to a computer. Alternatively, port 75 may be used to output data to an HDTV decoder to display images corresponding to a selected program or a program guide, for example.

Packets that contain PSI information are recognized by unit 45 as destined for the controller 115 buffer in unit 60. The PSI packets are directed to this buffer by unit 65 via units 45, 50 and 55 in a similar manner to that described for packets containing program content. Controller 115 reads the PSI from unit 60 and stores it in internal memory.

Controller 115 also generates condensed PSI (CPSI) from the stored PSI and incorporates the CPSI in a packetized datastream suitable for storage on a selectable storage medium. The packet identification and direction is governed by controller 115 in conjunction with the unit 45 and unit 47 PID, destination and encryption key look-up tables and control unit 65 functions in the manner previously described.

In addition, controller 115 is coupled to a communication interface unit 116 that operates in a manner similar to interface unit 1113 in FIG. 3. That is, unit 116 provides the capability to upload and download information to and from the internet. Communication interface unit 116 includes, for example, a modem for connecting to an internet service provider, e.g., via a telephone line or via a cable television line. The communication capability allows the system shown in FIG. 4 to provide email capability and internet related features such as web browsing in addition to receiving television programming.

Figure 5:
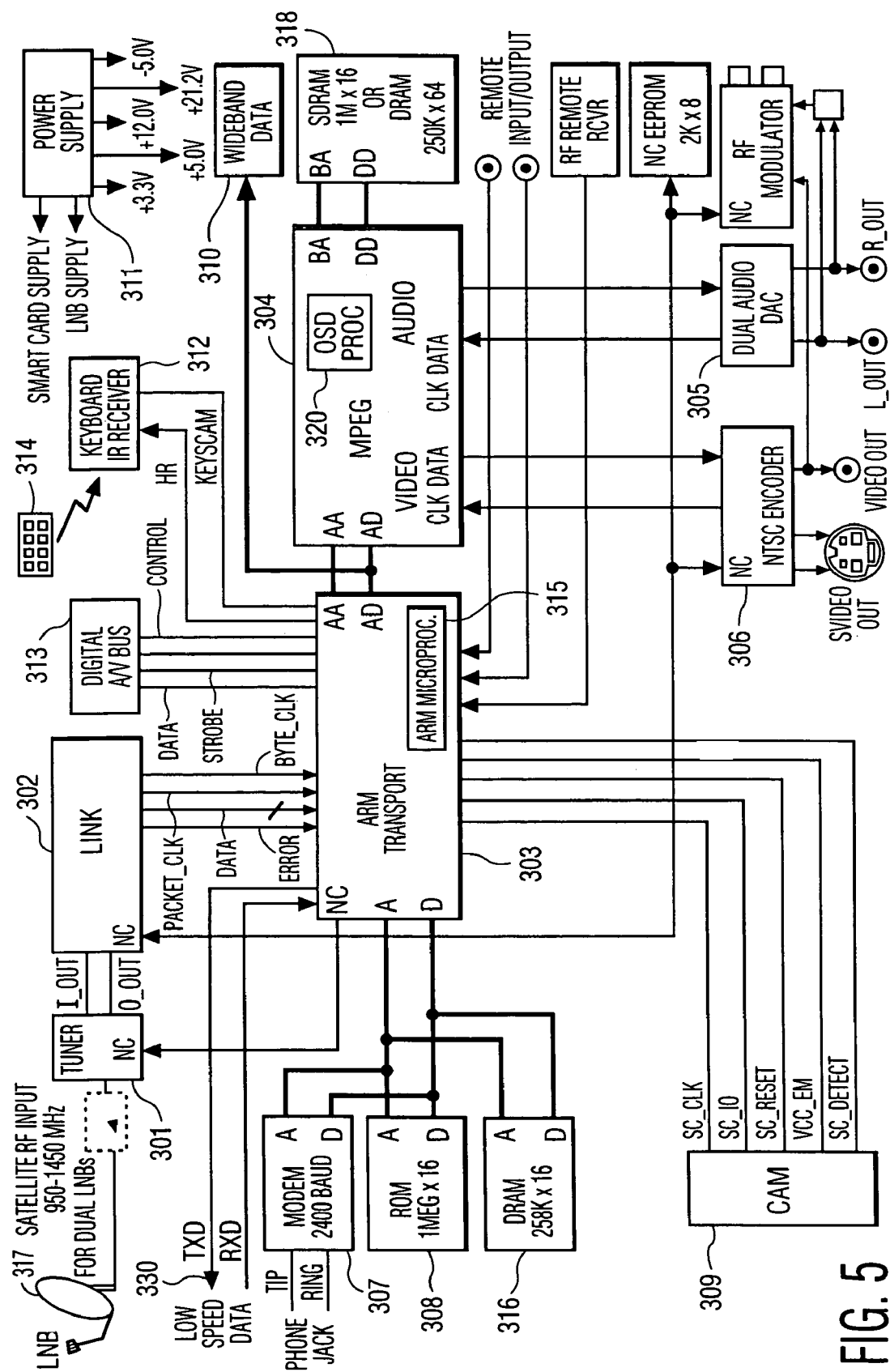
FIG. 5 is a schematic of a specific implementation of the apparatus generally shown on FIG. 4.

FIG. 5 is a specific implementation of an electronic device generally shown in FIG. 4 and described in detail above. FIG. 5 represents a satellite receiver set-top box, designed and manufactured by Thomson Consumer Electronics, of Indianapolis, Indiana, USA, for receiving DIRECTV™ satellite service provided by Hughes Electronics.

As shown in FIG. 5, the set-top box has a tuner 301 which receives and tunes applicable satellite RF signals in the range of 950-1450 Mhz from a satellite antenna 317 and low noise block down-converters (LNBs). The LNBs receive power from a power supply 311, which also supplies power to a smart card (not shown) and generates other DC voltages. The tuned analog signals are outputted to a link module 302 for further processing. Link module 302 is responsible for further processing of the analog tuned signals I_out and Q_out from tuner 301, including filtering and conditioning of the analog signals, and conversion of the analog signals into a digital output signal, DATA. The link module 302 is implemented as an integrated circuit (IC). The link module IC is manufactured by SGS-Thomson Microelectronics of Grenoble, France, and has Part No. ST 15339-610.

The digital output, DATA, from the link module 302 consists of compliant packetized data stream recognized and processable by the transport unit 303. The data stream, as discussed in detail in relation to FIG. 4, includes program guide data information and the data content of one or more program channels of the satellite broadcast service from DIRECTV™. As discussed above, program guide data contains information relating to the type of program (e.g., audio-only, video-only, etc.) as indicated, for example, by the "class" type.

The function of the transport unit 303 is the same as the transport system 25 shown in FIG. 4 and discussed already. As described above, the transport unit 303, processes the packetized data stream according to the Packet Identifiers (PID) contained in the header information. The processed data stream is then formatted into MPEG compatible, compressed audio and video packets and coupled to a MPEG decoder 304 for further processing.

The transport unit 303 is controlled by an Advanced RISC Microprocessor (ARM) 315 which is a RISC based microprocessor. The ARM processor 315 executes control software residing in ROM 308, and uses DRAM 316 as a working area for storing, for example, intermediate results during software execution as known in the art. Exemplary components of the software may be, for example, control programs shown in FIGS. 6-8 for processing user interface commands and displaying OSD information in accordance with aspects of the present invention as will be discussed below.

The transport unit 303 is typically implemented as an integrated circuit. For example, a preferred embodiment is an IC manufactured by SGS-Thomson Microelectronics and has a Part No. ST 15273-810 or 15103-65C.

The MPEG compatible, compressed audio and video packets from the transport unit 303 are delivered to a MPEG decoder 304. The MPEG decoder decodes the compressed MPEG datastream from the transport unit 303. The decoder 304 then outputs the applicable audio stream which can be further processed by the audio digital-to-analog converter (DAC) 305 to convert the digital audio data into analog sound. The decoder 304 also outputs applicable digital video data which represents image pixel information to a NTSC encoder 306. The NTSC encoder 306 then further processes this video data into NTSC compatible analog video signal so that video images may be displayed on a regular NTSC television screen. The MPEG decoder as described above may be implemented as an integrated circuit. One exemplary embodiment may be an MPEG decoder IC manufactured by SGS-Thomson Microelectronics having Part No. ST I3520.

Included in the MPEG processor 304 is an OSD processor 320. The OSD processor 320 reads data from SDRAM 318 which contains stored OSD information. OSD information corresponds to bitmap OSD graphics/text images. The OSD processor is capable of varying the color and/or translucency of each pixel of an OSD image under the control of the ARM microprocessor 315 in a conventional manner.

The OSD processor is also responsible for generating an exemplary program guide as shown in FIG. 6 under the control of the ARM processor 315. In the exemplary embodiment, upon detecting a user request to generate a guide display, the ARM microprocessor 315 processes the program guide data information obtained from a data stream provided by a program guide information provider and formats the guide data information into OSD pixel data corresponding to a "grid guide" as shown in FIG. 6. The OSD pixel data from the transport unit 303 is then forwarded to OSD processor 320 in the MPEG audio/video decoder 304 for generating the guide image, as described before.

A low speed data port 330 is used to connect to an IR-Blaster (not shown) for controlling a VCR for recording a program. As discussed before, an IR blaster is basically a programmable VCR remote control emulator controlled by the satellite receiver shown in FIG. 5. It is positioned in front of a VCR remote sensor of an attached VCR and will transmit commands such as "ON" and "RECORD" under the control of the satellite receiver at the appropriate time, according to the timer screen information entered by the users.

Additional relevant functional blocks of FIG. 5 include modem 307 which corresponds to the communication interface unit 116 shown in FIG. 4 for access to the internet, for example. Conditional Access Module (CAM) 309, corresponds to the NRSS decryption unit 130 shown in FIG. 4 for providing conditional access information. Wideband data module 310 corresponds to High Speed Data Port 75 shown in FIG. 4 for providing high speed data access to, for example, a HDTV decoder or a computer. A keyboard/IR Receiver module 312 corresponds to Remote Unit interface 120 shown in FIG. 4 for receiving user control commands from a user control unit 314. Digital AV bus module 313 corresponds to I/O port 100 shown in FIG. 4 for connection to an external device such as a VCR or a DVD player.

Figure 9:
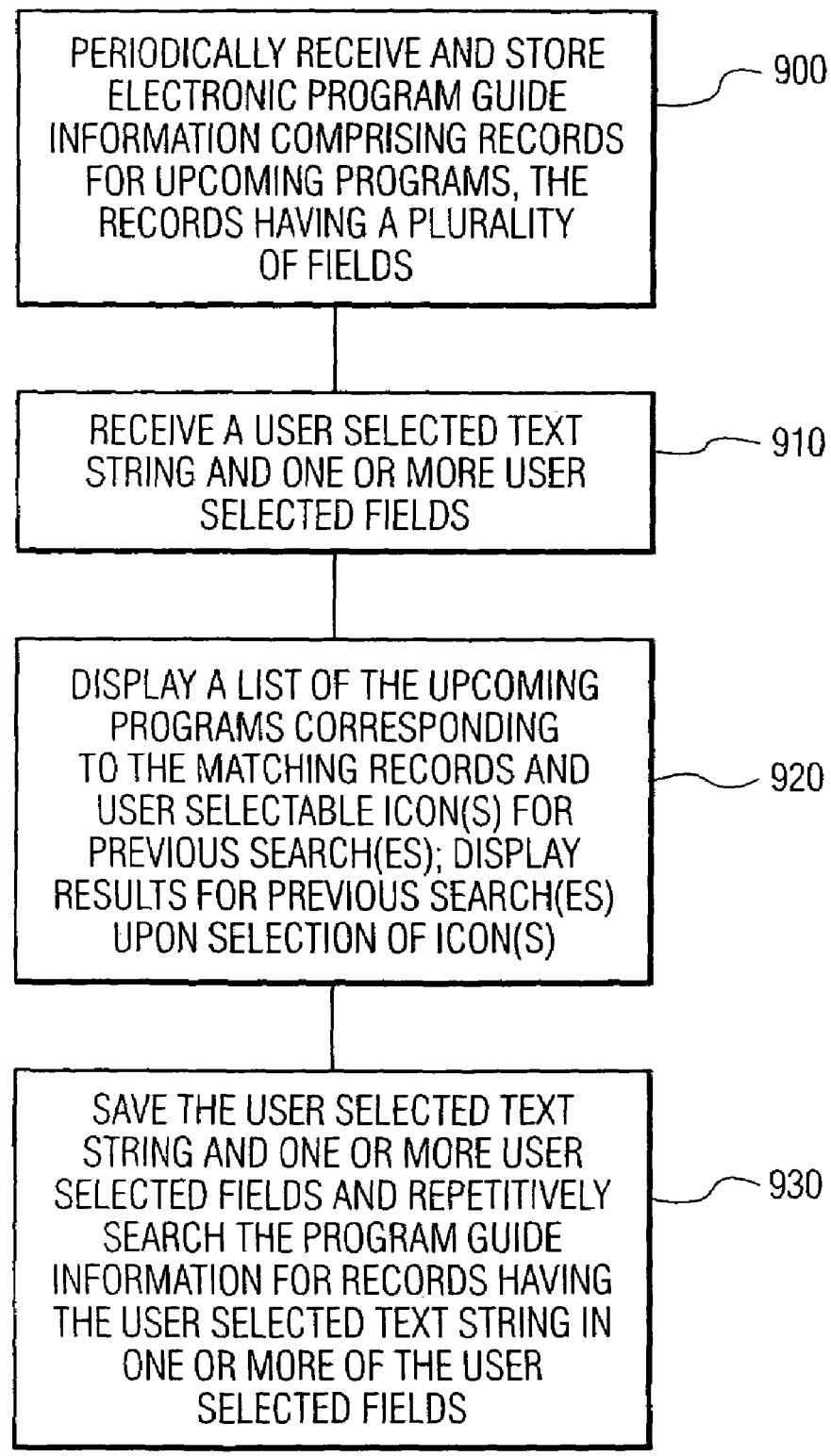
FIG. 9 is a flow chart of a method of searching program guide information in accordance with the present invention.

FIG. 9 is a high-level flow chart of an exemplary control program which according to the present invention, may be executed by any one of the apparatus shown in FIGS. 3-5, or any other suitably programmed control arrangement of an electronic host device. The term "electronic host device" as used herein is not limited to television receivers or personal computers, but rather encompasses hybrids thereof (e.g., PCTVs), cable television converter boxes, suitably equipped audiovisual program recorders (e.g., VCRs), satellite television and/or data signal converters, program guide receiving units, and the like, regardless of whether incorporated into a television receiver or personal computer or connected externally thereto. It will be appreciated that the process embodied in the exemplary control program may be implemented in hardware, software, or a combination thereof. A person skilled in the art would readily recognize from the flow chart and the following description that the control program when executed by any one of the systems described in FIGS. 3-5 or by other suitably programmed electronic host device will provide substantially the same feature and advantages in accordance with the present invention. Therefore, to avoid redundancy, the control program of FIG. 8 will be described below only with respect to the exemplary hardware implementation shown in FIG. 4.

In the illustrated embodiment, system controller 115 initially executes step 900 of FIG. 9, periodically receiving and storing electronic program guide information. The electronic program guide information comprises records corresponding to upcoming programs and are stored in a local memory. Each upcoming program has a unique record associated with it. Moreover, each record contains program identification data for at least one of topic, theme, description, title, actors, roles, director, writer, production studio, awards, keywords, or release date. Each record further comprises a plurality of fields, including at least one field for topic, theme, description, title, actors, roles, director, writer, production studio, awards, keywords, or release date. The records are adapted so that the program identification data is separated and placed into a corresponding field upon being stored.

Application interface 70, under the control of the system controller 115, generates an EPG menu as shown in FIG. 6. Preferably, the EPG menu is generated in response to the EPG display being activated (e.g., a user activating a particular key on remote control 125). In response to such activation, system controller 115 transfers EPG display data to application interface 70. Application interface 70 then outputs the corresponding display information to the video decoder for display on display module 11 (FIG. 6).

Referring to FIG. 6, EPG 500 typically occupies the entire display area of display module 11. EPG 500 shows a program schedule in a time-and-channel format, similar to a TV schedule listed in a newspaper. In particular, one dimension (e.g., horizontal) of the guide shows the time information while the other dimension (e.g., vertical) of the guide shows the channel information. The time information is conveyed to the user by having a time line 501 on the top portion of the guide and is demarked by half hour intervals. The channel information is conveyed to the user by channel numbers 510-516 and corresponding channel station names 520-526.

In addition, EPG 500 contains search icon 590. System controller 115 monitors the location of a position indicator, such as a cursor and or highlighting, on the EPG menu display. A user controls the location of the position indicator using direction and selection keys of remote control 125 as described above. Alternatively, the user can use a mouse, keyboard, or a joystick. By highlighting and clicking on search icon 590 or a similarly functioning icon, a user will access a user search interface according to the present invention as shown in FIG. 7.

Referring to FIG. 7, a display module 11 having user search interface 12 according to the present invention is illustrated. User search interface 12, facilitates step 910 of FIG. 9, receiving a user selected text string and one or more user selected fields. User search interface 12 comprises interface control field 13, text string field 14, character field 26, and field selection field 16. Interface control field 13 comprises enter text button 18, select field button 19, run search button 27, go back button 22, help button 23, and clear search button 21. When a user highlights and selects enter text button 18, a user can then use a cursor to highlight characters from character field 26. Upon entering a select command into the remote control 125, the highlighted character appears in text string field 14. The user repeats this character selection until the user has composed a desired text string in text string field 14. Upon completion, the characters contained in text string field 14 comprise the user selected text string.

Upon completing the composition of the user selected text string, the user can then enter field selection field 16 by highlighting and selecting select field button 19. Field selection field 16 has a list of the fields that the data in the records is divided into as described above (e.g., titles, actors, roles, etc.). A user selects what field(s) of the records will be searched for data corresponding to the user selected text string by highlighting and selecting one or more of the field names in field selection field 16. Once this is done a check appears next to that field name. A user can repeat this procedure for as many of fields of the records that he wishes to be searched for the user selected text string. The fields chosen by the user are the user selected fields.

Once the user has composed a user selected text and chosen the user selected fields, the user then highlights and selects run search button 27. By selecting run search button 27, step 920 of FIG. 9, searching the program guide information for records having the user selected text string in or more of the user selected fields, is performed. The search is facilitated by system controller 115 (FIG. 2) which is programmed to search the records. System controller 115 is programmed to search the records so that only those records which contain the user selected text string in one or more of the user selected fields will be delineated as a matching record.

Referring to FIG. 8, upon system controller 115 (FIG. 2) completing its search of the program guide records for matches, user search result interface 24 is generated in display module 11. User search result interface 24 performs step 920 of FIG. 9 by displaying a list of the upcoming programming programs corresponding to the matching records. This list is displayed in search result field 28. User search result interface 24 further comprises a list of previously performed searches and search results 801-805, that have been saved. By highlighting and selecting one of the saved searches 801-805, a user can view the search results for that search. A search can be edited or deleted by selecting edit search button 806 on delete screen button 807.

Referring to FIG. 9, if the search performed by the user is an ongoing search, step 930, saving the user selected text string and the one or more user selected fields and repetitively searching the program guide information for records having the user selected text string in one or more of the user selected fields, is performed.

The foregoing discussion discloses and describes merely exemplary embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

The invention claimed is:

1. A method for assisting a user in selecting a program for viewing or listening, comprising steps of:
   periodically receiving and storing electronic program guide information comprising records for forthcoming programs, each of the records having at least six user selectable search fields;
   enabling display of a first user interface for facilitating user selection of a text string and user selection of the at least six user selectable search fields;
   searching the electronic program guide information for records having the user selected text string in one or more of the at least six user selected search fields in response to a user command; and
   enabling display of a second user interface including a list of the forthcoming programs corresponding to the records identified in the searching step.

2. The method of claim 1 further comprising saving the user selected text string and the at least six user selected fields and repetitively searching the electronic program guide information for records having the user selected text string in the at least six user selected search fields.

3. The method of claim 1 wherein:
   the first user interface has at least three concurrently displayed portions comprising a first portion including an area for inputting the user selected text string, a second portion including a plurality of user selectable text characters that are concurrently displayed and in which the user selects one or more of the user selectable text characters for input into the first portion as the user selected text string, and a third portion including a listing of the at least six user selectable search fields;
   the at least six user selectable search fields are concurrently listed in the third portion;
   the user selects the at least six user selectable search fields by marking the at least six user selectable search fields in the third portion; and
   the marking is performed by placing a pre-defined mark adjacent to each of the at least six user selectable search fields.

4. The method of claim 3 wherein the second portion separates the first and third portions in the first user interface.

5. The method of claim 3 wherein the second portion occupies more space in the first user interface than the first portion.

6. The method of claim 1 wherein the at least six user selectable search fields comprise at least six of: topic, theme, description, title, actors, roles, director, writer, production studio, awards, keywords, and release date.

7. The method of claim 1 wherein the second user interface further includes a plurality of user selectable icons, each of the plurality of user selectable icons corresponding to a previous search and at least one of the user selectable icons being labeled with the user selected text string used for the previous search; and
   further comprising a step of:
   enabling display of saved search results for the previous search responsive to user selection of a corresponding one of the plurality of user selectable icons.

8. An apparatus for assisting a user in selecting a program for viewing or listening, comprising:
   control means for periodically receiving and storing electronic program guide information comprising records for forthcoming programs, each of the records having at least six user selectable search fields;
   interface means for enabling display of a first user interface for facilitating user selection of a text string and user selection of the at least six user selectable search fields;
   said control means searching the electronic program guide information for one or more of the records having the user selected text string in one or more of the at least six user selected search fields in response to a user command; and
   said interface means enabling display of a second user interface including a list of the forthcoming programs corresponding to the records identified during the search.

9. The apparatus of claim 8 wherein:
   the first user interface has at least three concurrently displayed portions comprising a first portion including an area for inputting the user selected text string, a second portion including a plurality of user selectable text characters that are concurrently displayed and in which the user selects one or more of the user selectable text characters for input into the first portion as the user selected text string, and a third portion including a listing of the at least six user selectable search fields;
   the at least six user selectable search fields are concurrently listed in the third portion;
   the user selects the at least six user selectable search fields by marking the at least six user selectable search fields in the third portion; and
   the marking is performed by placing a pre-defined mark adjacent to each of the at least six user selectable search fields.

10. The apparatus of claim 9 wherein the second portion separates the first and third portions in the first user interface.

11. The apparatus of claim 9 wherein the second portion occupies more space in the first user interface than the first portion.

12. The apparatus of claim 8 wherein the at least six user selectable search fields comprise at least six of: topic, theme, description, title, actors, roles, director, writer, production studio, awards, keywords, and release date.

13. The apparatus of claim 8 wherein the second user interface further includes a plurality of user selectable icons, each of the plurality of user selectable icons corresponding to a previous search and at least one of the user selectable icons being labeled with the user selected text string used for the previous search, and further wherein saved search results for the previous search are displayed responsive to user selection of a corresponding one of the plurality of user selectable icons.

* * * * *